US010884563B2

(12) United States Patent
Gui et al.

(10) Patent No.: US 10,884,563 B2
(45) Date of Patent: Jan. 5, 2021

(54) METHOD FOR DETERMINING CHANGE OF INITIAL DISTANCE OF SENSING ELECTRODE

(71) Applicant: SHENZHEN GOODIX TECHNOLOGY CO., LTD., Shenzhen (CN)

(72) Inventors: Xintao Gui, Shenzhen (CN); Xiaoxiang Chen, Shenzhen (CN); Xiang Zhong, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 81 days.

(21) Appl. No.: 16/110,655

(22) Filed: Aug. 23, 2018

(65) Prior Publication Data
US 2018/0364867 A1 Dec. 20, 2018

Related U.S. Application Data

(63) Continuation of application No. PCT/CN2016/105086, filed on Nov. 8, 2016.

(51) Int. Cl.
*G09G 5/00* (2006.01)
*G06F 3/044* (2006.01)
(Continued)

(52) U.S. Cl.
CPC ............. *G06F 3/0445* (2019.05); *G01L 1/144* (2013.01); *G06F 3/0418* (2013.01); *G06F 3/0447* (2019.05); *G06F 3/04144* (2019.05)

(58) Field of Classification Search
CPC ......... G01L 1/142; G01L 1/144; G01L 1/146; G01L 1/16; G01L 1/162; G06F 3/0416; G06F 2203/04104; G06F 3/044–0448
(Continued)

(56) References Cited

U.S. PATENT DOCUMENTS

| 8,525,799 B1 | 9/2013 | Grivna et al. |
| 2012/0086666 A1* | 4/2012 | Badaye ................. G06F 3/0416 345/174 |

(Continued)

FOREIGN PATENT DOCUMENTS

| CN | 102929422 A | 2/2013 |
| CN | 105100427 A | 11/2015 |

(Continued)

*Primary Examiner* — Jennifer T Nguyen

(57) ABSTRACT

A method for determining a change of an initial distance of a sensing electrode is provided. The method includes: calculating a real-time pressure output by each sensing electrode according to real-time feature data output by each sensing electrode in a touch screen when a pressure is applied on the touch screen and a corresponding relationship between the feature data and the pressure; rectifying the real-time pressure output by each sensing electrode according to prestored relative elastic coefficients at different press positions relative to each sensing electrode; and determining a sensing electrode whose initial distance is changed among all the sensing electrodes according to a difference between the rectified real-time pressures output by different sensing electrodes, to calibrate the corresponding relationship between the feature data and the pressures of the sensing electrode whose initial distance is changed.

17 Claims, 12 Drawing Sheets

(51) Int. Cl.
*G06F 3/041* (2006.01)
*G01L 1/14* (2006.01)

(58) Field of Classification Search
USPC .......................................... 345/173, 174, 178
See application file for complete search history.

(56) References Cited

U.S. PATENT DOCUMENTS

| | | |
|---|---|---|
| 2014/0109696 A1 | 4/2014 | Chen et al. |
| 2018/0059823 A1* | 3/2018 | Chang .................. G06F 3/0416 |
| 2018/0067604 A1* | 3/2018 | White ..................... G06F 3/044 |

FOREIGN PATENT DOCUMENTS

| | | |
|---|---|---|
| CN | 105224132 A | 1/2016 |
| CN | 105607775 A | 5/2016 |
| CN | 105677130 A | 6/2016 |
| CN | 105681562 A | 6/2016 |
| CN | 105739776 A | 7/2016 |
| CN | 105912159 A | 8/2016 |
| CN | 106055157 A | 10/2016 |
| JP | 2005134992 A | 5/2005 |
| KR | 20090059078 A | 6/2009 |
| KR | 20150144992 A | 12/2015 |
| KR | 20160113684 A | 9/2016 |

\* cited by examiner

METHOD FOR DETERMINING CHANGE OF INITIAL DISTANCE OF SENSING ELECTRODE

CROSS REFERENCE TO RELATED APPLICATIONS

The present application is a continuation of international application No. PCT/CN2016/105086, filed on Nov. 8, 2016, which is hereby incorporated by reference in its entirety.

TECHNICAL FIELD

Embodiments of the present disclosure relate to the technical field of touch control, and in particular, relate to a method for determining a change of an initial distance of a sensing electrode.

BACKGROUND

Portable electronic devices bring great convenience to people's daily life, and have become an indispensable tool for people. A portable electronic device may have multiple types of input apparatuses, for example, keypad, mouse, operating lever, laser pen, touch screen and the like. However, the touch technology is quickly and widely applied to various electronic devices because of good interactability thereof, and allows users to operate a terminal by virtue of gesture operations. In this way, the traditional mechanical keyboard is not needed any more, such that man-machine interaction is more direct and convenient.

With development of the touch technology, pure finger touch may not accommodate the users' needs in multi-dimensional input. Integrating the pressure detection technology into the touch technology adds another dimension of information based on the location information, and allows the touch screen to sense pressures of the finger and the pressure produced by a light press or a heavy press, and call different functions according to different pressures correspondingly. In this way, a better user experience is provided, for example, pop-up of a pull-down menu or a "small suspended ball" when the screen is pressed with a small pressure, acceleration of the up-down roll and left-right roll when the screen is pressed with a great pressure, touch feedback and other effects.

At present, the touch detection technology applied in most of the portable electronic devices employs a capacitive sensor array, and therefore, the pressure detection technology can employ the array capacitors as the sensors for pressure detection, which is a great advantage. However, during practice of the present disclosure, the inventors have found that since the capacitive sensor array is sensitive to the initial distance of the sensing electrodes, but the portable electronic device may fall off, and may be twisted or collided during the use, and thus the initial distance of the sensing electrode may be changed. As a result, the result of the pressure detection is subject to a great deviation.

SUMMARY

Embodiments of the present disclosure are intended to provide a method for determining a change of an initial distance of a sensing electrode, a method for self-calibrating a corresponding relationship between feature data and pressures, and a pressure detection method supporting self-calibration, to at least solve the above technical problem in the prior art.

To achieve the objectives of embodiments of the present disclosure, embodiments of the present disclosure provide a method for determining a change of an initial distance of a sensing electrode. The method includes:

calculating a real-time pressure output by each sensing electrode according to real-time feature data output by each sensing electrode in a touch screen when a pressure is applied on the touch screen and a corresponding relationship between the feature data and the pressures;

rectifying the real-time pressure output by each sensing electrode according to prestored relative elastic coefficients at different press positions relative to each sensing electrode; and determining a sensing electrode whose initial distance is changed among all the sensing electrodes according to a difference between the rectified real-time pressure output by different sensing electrodes, to calibrate the corresponding relationship between the feature data and the pressures of the sensing electrode whose initial distance is changed.

Embodiments of the present disclosure further provide a method for self-calibrating a corresponding relationship between the feature data and the pressures. After the sensing electrode whose initial distance is changed is determined, the method includes:

rectifying the real-time pressure output by each sensing electrode to obtain a rectified real-time pressure according to prestored relative elastic coefficients at different press positions relative to each sensing electrode, and determining that a discrete degree of the rectified real-time pressure is greater than a predetermined first threshold; and calibrating the corresponding relationship between the feature data and the pressures of the sensing electrode whose initial distance is changed according to a plurality of groups of feature data before and when the press is applied, and the prestored relative elastic coefficients at different press positions relative to each sensing electrode.

Embodiments of the present disclosure further provide a pressure detection method supporting self-calibration. The method includes:

acquiring a calibrated corresponding relationship between the feature data and the pressures of the sensing electrode according to any one of the methods of self-calibrating the corresponding relationship between the feature data and the pressures as described above;

calibrating real-time feature data output by each sensing electrode when being applied with a pressure according to a change of current zero-point feature data of each sensing electrode relative to prestored zero-point data; and calculating the pressure output by each sensing electrode when being applied with a pressure according to the calibrated feature data of each sensing electrode and the calibrated corresponding relationship between the feature data and the pressures.

In the embodiments of the present disclosure, a real-time pressure output by each sensing electrode is calculated according to real-time feature data output by all the sensing electrodes in a touch screen when a pressure is applied on the touch screen and a corresponding relationship between the feature data and the pressures; the real-time pressure output by each sensing electrode is rectified according to prestored relative elastic coefficients at different press positions relative to each sensing electrode; and a sensing electrode whose initial distance is changed among all the sensing electrodes is determined according to a difference between the rectified real-time pressures output by different sensing electrodes, such that a prestored corresponding relationship between the feature data and the pressures is calibrated. In this way, according to a change of current zero-point feature data of each sensing electrode relative to prestored zero-point data, the real-time feature data output by each sensing electrode when being applied with a pressure is calibrated, to self-calibrate the pressure, such that accuracy of a pressure detection result is ensured.

DETAILED DESCRIPTION

Practice of the present application is described in detail with reference to drawings and specific embodiments, such that the practice of addressing the technical problem using the technical means according to the present application and achieving the technical effects may be better understood and conducted.

In the embodiments of the present disclosure, a real-time pressure output by each sensing electrode is calculated according to real-time feature data output by each sensing electrode in a touch screen when a pressure is applied on the touch screen and a corresponding relationship between the feature data and the pressures; the real-time pressures output by each sensing electrode are rectified according to prestored relative elastic coefficients at different press positions relative to the sensing electrodes; and a sensing electrode whose initial distance is changed among all the sensing electrodes is determined according to a difference between the rectified real-time pressures output by different sensing electrodes, such that a prestored corresponding relationship between the feature data and the pressures is calibrated. In this way, according to a change of current zero-point feature data of each sensing electrode relative to prestored zero-point data, the real-time feature data output by each sensing electrode when being applied with a pressure is calibrated, to self-calibrate the pressure, such that accuracy of a pressure detection result is ensured.

Figure 1:
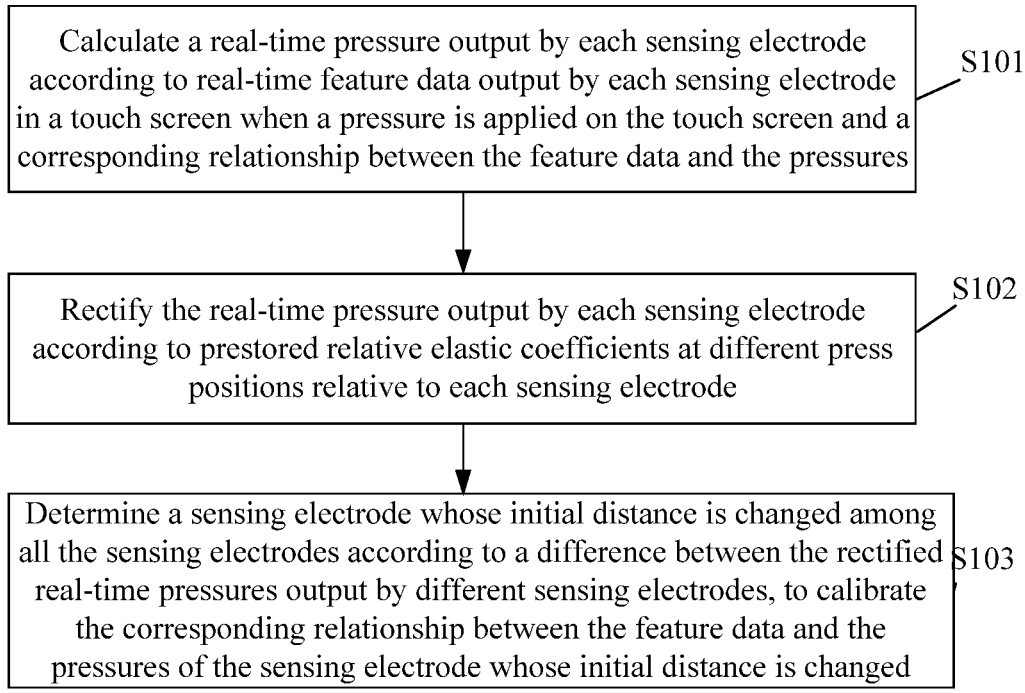
FIG. 1 is a schematic flowchart of a method for determining a change of an initial distance of a sensing electrode according to Embodiment 1 of the present disclosure.

FIG. 1 is a schematic flowchart of a method for determining a change of an initial distance of a sensing electrode according to Embodiment 1 of the present disclosure. As illustrated in FIG. 1, the method includes the following steps:

S101: A real-time pressure output by each sensing electrode is calculated according to real-time feature data output by each sensing electrode in a touch screen when a pressure is applied on the touch screen and a corresponding relationship between the feature data and the pressures.

In this embodiment, the corresponding relationship between the feature data and the pressures may be a corresponding relationship between the feature data and the pressures that is established before delivery from a factory, or may be a corresponding relationship between the feature data and the pressures that is obtained by calibrating the corresponding relationship between the feature data and the pressures before delivery from a factory. In this embodiment, description is given using the scenario where the corresponding relationship between the feature data and the pressures is a corresponding relationship between the feature data and the pressures that is established before delivery from a factory as an example.

In this embodiment, before the touch screen is delivered from a factory, the corresponding relationship between the feature data and the pressures when a pressure is applied onto the touch screen is pre-established; during practical use, the real-time feature data output by a sensing electrode is introduced into the corresponding relationship between the feature data and the pressures that is established before delivery from a factory. In this way, the real-time pressure output by each sensing electrode may be calculated, and the real-time pressure represents the pressure which is applied on the touch screen.

In this embodiment, the feature data output by the sensing electrode is relevant to the specific detection circuit, for example, if a detection circuit is capable of detecting an output voltage of the sensing electrode, the feature data may be the output voltage. Other cases may be analogous, which are not described herein any further.

Figure 2:
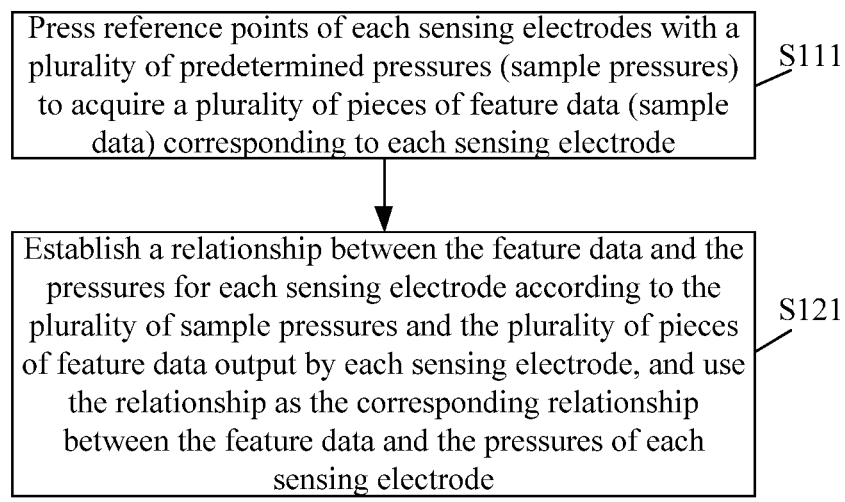
FIG. 2 is a schematic flowchart of establishing a corresponding relationship between the feature data and the pressures before delivery from a factory according to Embodiment 2 of the present disclosure.

The establishment of the corresponding relationship between the feature data and the pressures may be referenced to FIG. 2 and the related description, which is thus not described herein any further.

Figure 13:
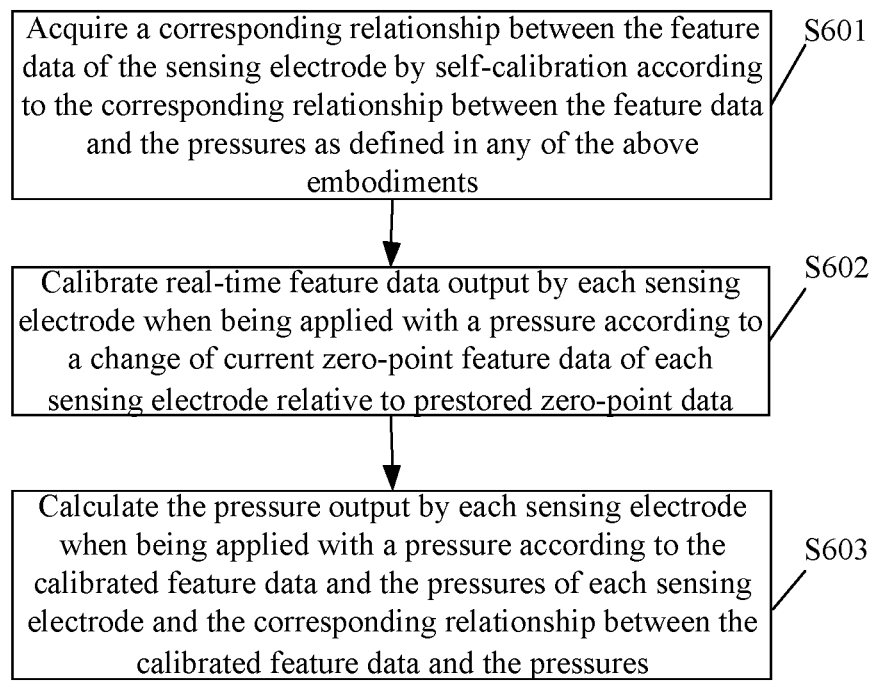
FIG. 13 is a schematic flowchart of a pressure detection method supporting self-calibration according to Embodiment 6 of the present disclosure.

In this embodiment, the real-time feature data may be feature data that is calibrated by using a pressure detection method supporting self-calibration as illustrated in FIG. 13.

S102: The real-time pressures output by each sensing electrode are rectified according to prestored relative elastic coefficients at different press positions relative to each sensing electrode.

In this embodiment, when a pressure is applied at different positions of a sensing electrode, a deformation amount at the same sensing electrode may vary, but the pressure and the deformation amount may be subject to a definite relationship. This definite relationship is determined by the physical structure of the screen body. An output pressure can be adjusted according to this relationship, such that the system can output the same pressure when the same pressures are applied at different positions on the touch screen.

During practice of the present disclosure, the inventors have found that the deformation of the sensing electrode and the pressure are approximately in a linear relationship. Assume that any pressure $F_a$ is applied at a position Pa, the deformation amount of a sensing electrode (for example, S0) is $\Delta d_{a0}$, a pressure $F_0$ is directly applied at a reference point of the sensing electrode such that the deformation amount of the sensing electrode is still $\Delta d_{a0}$. With respect to the sensing electrode, press with a pressure of $F_0$ at the reference point of the sensing electrode is equivalent to press with a pressure of $F_a$ at the position Pa, and the feature data values corresponding to the sensing electrode are the same. Based on the above analysis, the following relation may be obtained:

$$F_a = k_{a0}\Delta d_{a0}, \ F_0 = k_0 \Delta d_{a0} \Rightarrow F_a = \frac{k_{a0}}{k_0} F_0$$

In other words, when the pressure is applied at the position Pa, the feature data output by the sensing electrode is introduced into the corresponding relationship between the feature data and the pressures in step S101 to acquire the pressure $F_0$ calculated according to the feature data corresponding to the sensing electrode.

The actual pressure $F_a$ at the position Pa is acquired by multiplying $F_0$ with $$\frac{k_{a0}}{k_0}.$$

It is defined that $$\frac{k_{a0}}{k_0}$$

is a relative elastic coefficient at the position Pa relative to the sensing electrode S0, and marked as $u_{a0}$. The relative elastic coefficient mainly reflects a deformation amount difference at the same position when any different positions on the touch screen are pressed with a pressure, which is mainly determined by the physical structure. With respect to any position P, a relative elastic coefficient exists for each sensing electrode, and may be marked as $u_{ij}$.

Figure 9:
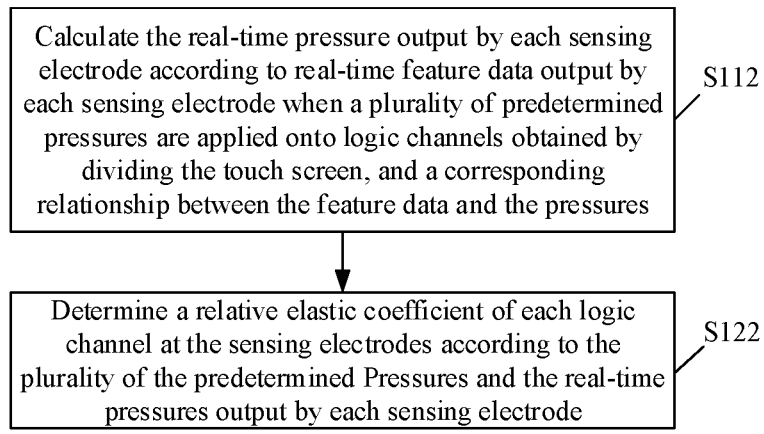
FIG. 9 is a schematic flowchart of establishing a relative elastic coefficient according to Embodiment 3 of the present disclosure.

The establishment of the relevant elastic coefficients may be referenced to FIG. 9 and the related description.

S103: A sensing electrode whose initial distance is changed among all the sensing electrodes is determined according to a difference between the rectified real-time pressures output by different sensing electrodes, to calibrate the corresponding relationship between the feature data and the pressures of the sensing electrode whose initial distance is changed.

In this embodiment, a difference between the real-time pressures output by different sensing electrodes may be determined according to a discrete degree of the rectified real-time pressures output by different sensing electrodes, such that the sensing electrodes whose initial distance is changed among all the sensing electrodes may be determined.

In this embodiment, an average difference (MD), a variance ($\sigma^2$) and a coefficient of variation (CV) may be calculated according to the rectified real-time pressures output by all the sensing electrodes, such that the discrete degree is acquired.

$$\text{Average difference: } MD = \frac{\sum_{i=0}^{n}|F'_i - \mu|}{n}, \quad (1)$$

$$\mu = \frac{1}{n}\sum_{i=0}^{n} F'_i;$$

$$\text{Variance: } \sigma^2 = \frac{\sum_{i=0}^{n}(F'_i - \mu)^2}{n}; \quad (2)$$

$$\text{Coefficient of variation: } CV = \frac{\sigma^2}{\mu}; \quad (3)$$

In the above formulae, n denotes the number of sensing electrodes, and $F_i'$ denotes a rectified pressure of the ith sensing electrode.

In other embodiments, during calculation of the pressure, some of the rectified pressures $F_1', \ldots, F_8'$ are correct relative to the actual pressures whereas some may be larger and some may be smaller than the actual pressures. Therefore, the pressures output based on $F_0', F_1', \ldots, F_8'$ by using a filter method is output as a final pressure. For example, an average value of all the sensing electrodes is taken, and a weighted average value is taken based on the distance between the press position and the sensing electrode, and averaging may be performed only based on the pressures of one or more sensing electrodes that are closest to the press position.

FIG. 2 is a schematic flowchart of establishing a corresponding relationship between the feature data and the pressures before delivery from a factory according to Embodiment 2 of the present disclosure. As illustrated in FIG. 2, the method includes the following steps:

S111: Reference points of each sensing electrode are pressed using a plurality of different predetermined pressures (sample pressures) to acquire a plurality of pieces of feature data (sample data) corresponding to each sensing electrode.

In this embodiment, the press position may be the center point of each sensing electrode or may be any position of each sensing electrode. The position is referred to as the reference point of the sensing electrode. The reference point is preferably the position where the deformation amount of the sensing electrode is the maximum, for example, the center point. A plurality of sample pressures may be selected with reference to the maximum pressure and the minimum pressure during use of the user.

S121: A relationship between the feature data and the pressures for each sensing electrode is established according to the plurality of sample pressures and the plurality of pieces of feature data output by each sensing electrode, and the relationship is used as the corresponding relationship between the feature data and the pressures of each sensing electrode.

In this embodiment, the relationship between the feature data and the pressures may be stored in a table form, to calculate the real-time pressures output by each sensing electrode by table lookup; or the relationship between the feature data and the pressures is established via curve fitting. Or, the relationship between the feature data and the pressures is established via curve fitting, and then a storage table is established according to the relationship, thus a table with a small step value may be established with a small number of sample pressures.

In this embodiment, when the real-time pressure output by each sensing electrode is calculated by table lookup, if the real-time feature data output by the sensing electrode is between two pieces of sample feature data, the real-time pressure output by the corresponding sensing electrode is calculated by piecewise approximation.

In this embodiment, if the touch controller has powerful processing capabilities, the relationship between the feature data and the pressures is represented by establishing a formula via curve fitting, and the real-time pressure output by each sensing electrode is calculated according to the established formula; if the touch controller has weak processing capabilities, the relationship between the feature data and the pressures is stored in the table form, and the real-time pressures output by each sensing electrode are calculated by table lookup; and if the real-time feature data output by the sensing electrode is between two pieces of sample feature data, the real-time pressure output by the corresponding sensing electrode is calculated by piecewise approximation.

FIG. 2 is schematically illustrated with reference to FIG. 3 to FIG. 5.

Figure 3:
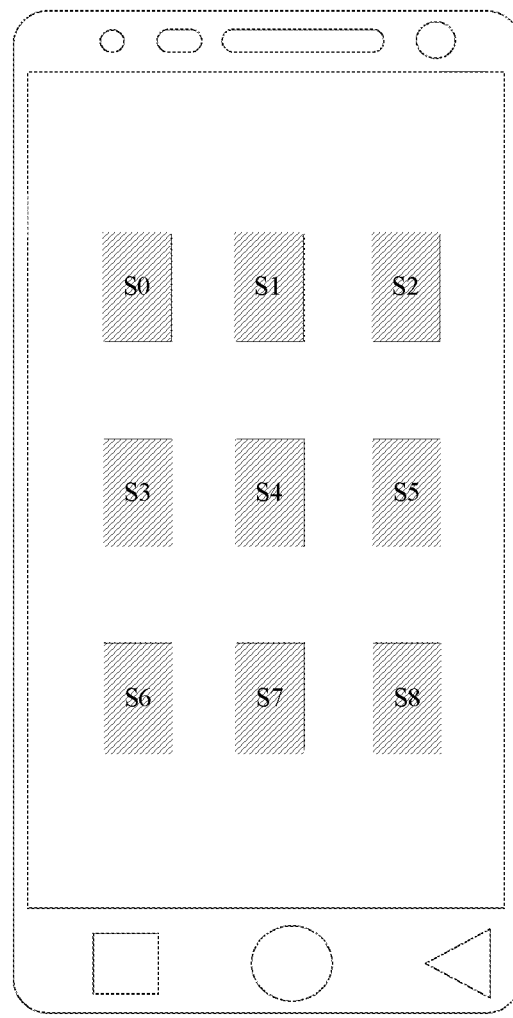
FIG. 3 is a schematic plan diagram of a pressure sensing electrode applied in the method as illustrated in FIG. 2.
Figure 4A:
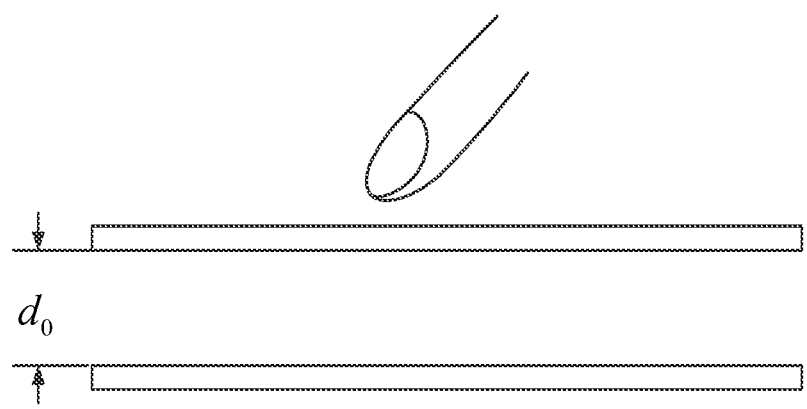
FIG. 4a and FIG. 4b are schematic diagrams of deformation of an individual pressure sensing electrodes before and when being applied with a pressure.
Figure 4B:
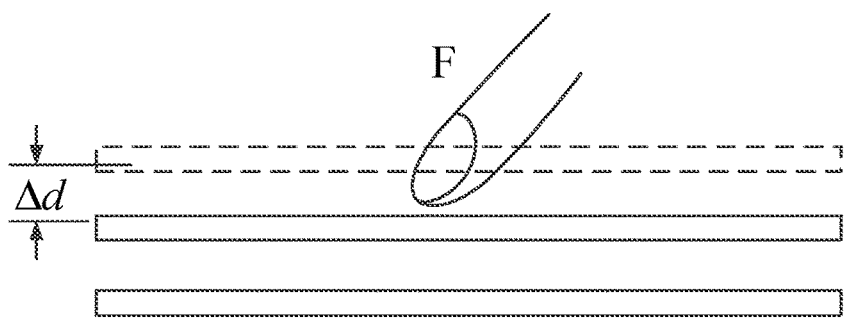

FIG. 3 is a schematic diagram of plan view of a pressure sensing electrode applied in the method as illustrated in FIG. 2. FIG. 4a and FIG. 4b are schematic diagrams of deformation of an individual pressure sensing electrodes before and when being applied with a pressure. FIG. 5 is a schematic structural diagram of a pressure detection circuit. FIG. 6 is a schematic diagram of a curve fitting result of the method as illustrated in FIG. 2.

Referring to FIG. 3, nine capacitive sensing electrodes are arranged, and each sensing electrode is equivalent to a sensor. Still referring to FIG. 4a and FIG. 4b, a parallel plate capacitor $C_2$ in the sensing electrodes is used as an effective capacitor for pressure detection. Before being pressed, the value of the parallel plate capacitor $C_2$ is $C_{20}$, and the initial distance between two electrodes of the capacitor is $d_0$; and when being pressed, the deformation amount of the parallel plate capacitor $C_2$ is $\Delta d$ and the value of the parallel plate capacitor $C_2$ is $$C_{20}\frac{d_0}{d_0 - \Delta d}.$$

Still referring to FIG. 5, in the case where the sensing electrode is a self-capacitor, a driving signal is coupled via a resistor R to a detection capacitor Ctp (Ctp=C1+C2); secondly, the signal on the detection capacitor Ctp is amplified by an amplifier circuit; subsequently, the signal amplified by the amplifier circuit is sent to a filter circuit for filtering; afterwards, the signal output by the filter circuit is sent to a demodulation circuit for demodulation to acquire a specific format of feature data (Rawdata) (for example, values of the amplitude and phase of a voltage or current signal) to represent the pressure; and finally, the Rawdata is sent to a calculation system, and the calculation system may calculate the current pressure according to the Rawdata.

Assume that the driving signal is A sin (vt+φ) and the gain of the amplifier circuit is G, then the amplitude of the output signal, i.e., the Rawdata, is:

$$Rawdata = \frac{AG}{\sqrt{1 + [wR_0(C_1 + C_2)]^2}} \quad (4)$$

$$= \frac{AG}{\sqrt{1 + \left[wR_0\left(C_1 + C_{20}\frac{d_0}{d_0 - \Delta d}\right)\right]^2}}$$

In formula (4), $\Delta d$ represents a deformation amount generated when a pressure F is applied. The deformation generated by the pressure in the embodiments of the present disclosure is a minor deformation. F and $\Delta d$ approximately satisfy the Hooke's law, that is, F=k $\Delta d$. The values of k corresponding to different positions are different. Formula (4) may be expressed as follows:

$$Rawdata = \frac{AG}{\sqrt{1 + \left[wR_0\left(C_1 + \frac{C_2 d_0}{d_0 - F/k}\right)\right]^2}} \quad (5)$$

$$= \frac{AG}{\sqrt{1 + \left[wR_0\left(C_1 + \frac{kC_{20}d_0}{kd_0 - F}\right)\right]^2}}$$

Assume that a=AG, b=$wR_0C_1$, c=$wR_0C_{20}kd_0$, d=$kd_0$, then formula (5) may be expressed as follows:

$$Rawdata == \frac{a}{\sqrt{1 + \left(b + \frac{c}{d - F}\right)^2}}$$

For the detection circuit, the parameter θ to be determined includes a, b, c and d. That is, each sensing electrode corresponds to a group of parameters θ, and formula (5) may be regarded as an assumed function model.

Curve fitting is employed to determine the parameter θ in this embodiment. The pressure curve of each sensing electrode reflects the corresponding relationship between the feature data and the pressures detected by the sensing electrode when a pressure is applied on the reference point of each sensing electrode, which may be referenced to as an R-F curve (a Rawdata-Pressure curve), marked as $R_j=f_j(\theta,F)$ (j=0,1, . . . 8), where $\theta_j$ is a parameter to be determined and corresponds to the jth sensing electrode.

The specific method includes:

a. n different sample pressures $F_i$ (i=1,2, . . . n) are applied on the reference point of each sensing electrode, and the raw feature data (Rawdata) is recorded, including nine groups of raw sample data: $(F_1, r_{01}),(F_2, r_{02}), \ldots , (F_n,r_{0n})$; $(F_1,r_{11})$, $(F_2,r_{12}), \ldots , (F_n,r_{1n})$; . . . ; $F_1,r_{81}),(F_2,r_{82}), \ldots , (F_n,r_{8n})$.

b. With reference to the assumed function model of the R-F curve $R_j=f_j(\theta,F)$ (j=0,1, . . . 8) of each sensing electrode, as illustrated in formula (5), fitting is performed using the raw sample data $(F_1,r_{01}),(F_2,r_{02}), \ldots , (F_n,r_{0n})$; $(F_1,r_{11}),(F_2, r_{12}), \ldots , (F_n,r_{1n})$; . . . ; $(F_1,r_{81}),(F_2,r_{82}), \ldots , (F_n,r_{8n})$ to determine the parameter $\theta_j$, j=0,1, . . . 8.

The curve fitted by using the above method is as illustrated in FIG. 6. The sample pressures are 0 g, 100 g, 200 g, 300 g, 400 g, 500 g and 600 g. Fitting is performed using the sample data and the Rawdata-Pressure curve obtained via fitting is drawn. As seen from FIG. 6, the sample data all better falls within the Rawdata-Pressure curve obtained via fitting.

It should be mentioned that during acquisition of the sample data, the sample pressures are not limited to 0 g, 100 g, 200 g, 300 g, 400 g, 500 g and 600 g, and may be any pressure within a measurement range as long as the number of sample pressures is greater than the number of components in the parameter $\theta_j$. For example, the parameter $\theta_j$ in the above embodiment has totally four components a, b, c and d, and in this case, the number of sample pressures shall be greater than 4.

The real-time pressure may be calculated according to the R-F curve $R_j=f_j(\theta_j,F)$ (j=0,1, . . . 8) after the parameter $\theta_j$ is determined. When the touch controller has limited calculation capabilities, the real-time pressure may be calculated by piecewise approximation as follows:

1) A Rawdata-Pressure relationship table is established for each sensing electrode according to $R_j=f_j(\theta_j,F)$(j=0,1, . . . 8) at a specific pressure step (for example, 50 g), and the established table is stored in advance into a flash memory.

2) Assume that the raw feature value of the jth sensing electrode acquired in real time is $y_j$, and $y_j$ is between the feature data $y_{j,i}$ and the feature data $y_{j,i+1}$ corresponding to two predetermined pressures $F_i$ and $F_{i+1}$, that is, $y_{j,i} > y_j \geq y_{j,i+1}$ (or $y_{j,i} < y_j \leq y_{j,i+1}$), then the pressures is calculated by piecewise approximation, that is, $$F = F_i + \text{step} * \frac{y_{j,i} - y_j}{y_{j,i} - y_{j,i+1}}.$$

TABLE 1

Relationship between raw feature data and pressures

| Sensor | Pressure | | | | | | |
|---|---|---|---|---|---|---|---|
| | $F_0$ | $F_1$ | $F_2$ | $F_3$ | $F_4$ | $F_5$ | . . . |
| S0 | $y_{00}$ | $y_{01}$ | $y_{02}$ | $y_{03}$ | $y_{04}$ | $y_{05}$ | . . . |
| . | . | . | . | . | . | . | |
| . | . | . | . | . | . | . | |
| . | . | . | . | . | . | . | |
| S8 | $y_{80}$ | $y_{81}$ | $y_{82}$ | $y_{83}$ | $y_{84}$ | $y_{85}$ | |

Figure 5:
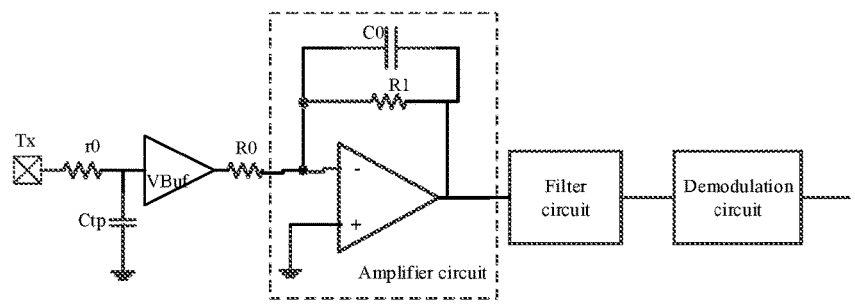
FIG. 5 is a schematic structural diagram of a pressure detection circuit.
Figure 6:
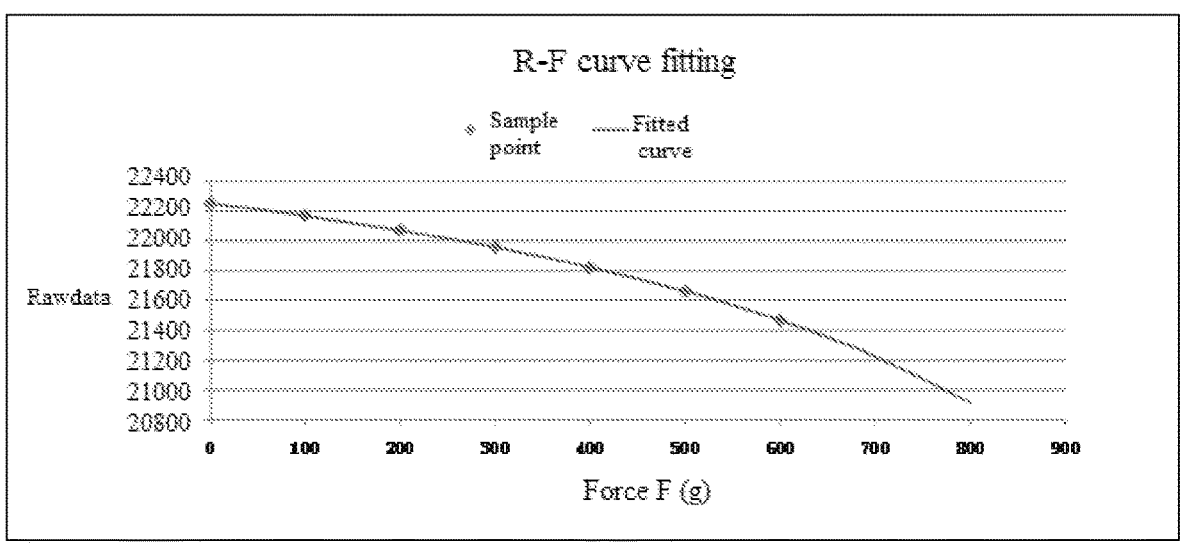
FIG. 6 is a schematic diagram of a curve fitting result of the method as illustrated in FIG. 2.
Figure 7:
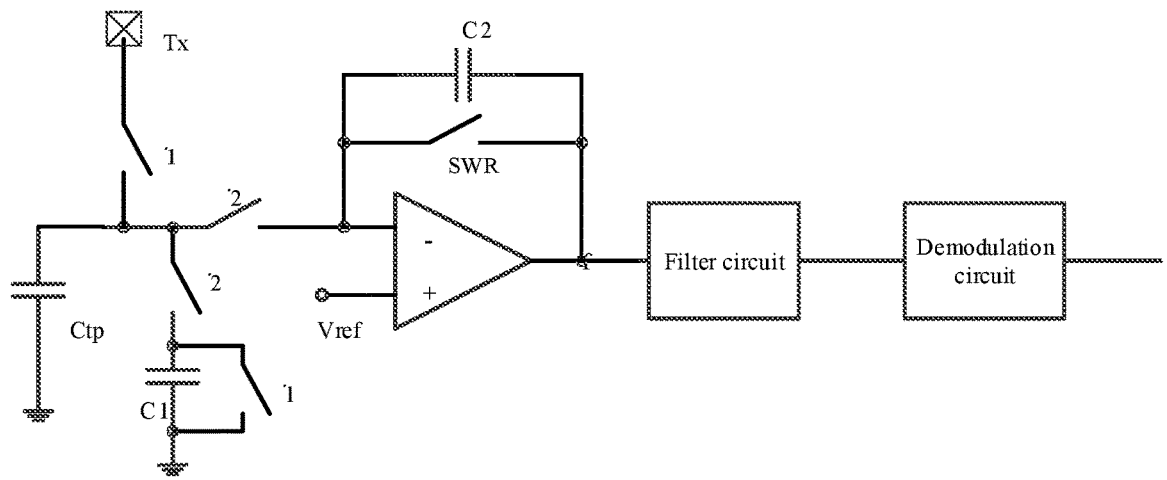
FIG. 7 is a pressure detection circuit applied in a self-capacitor.
Figure 8:
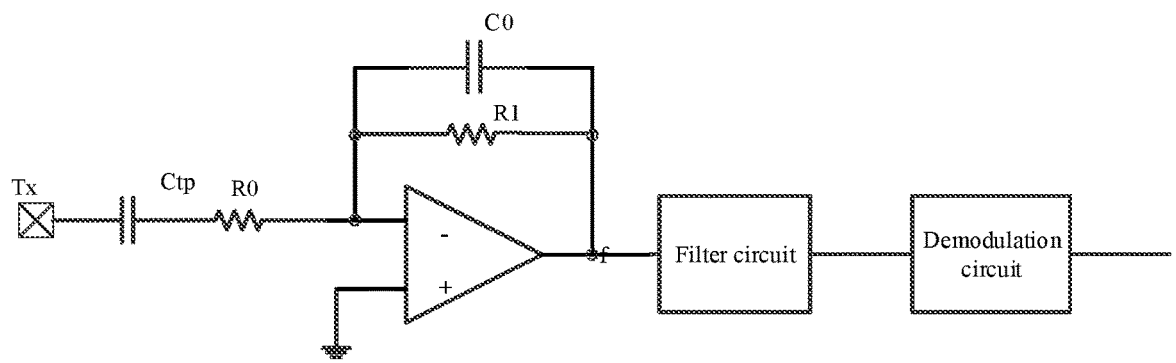
FIG. 8 is a pressure detection circuit applied in a mutual-capacitor.

It should be noted that the detection circuit in FIG. 5 may be replaced by an alternative one, as illustrated in FIG. 7 and FIG. 8. FIG. 7 is a pressure detection circuit applied for self-capacitance detection, and FIG. 8 is a pressure detection circuit applied for mutual-capacitance detection. In these two cases, the parameter $\theta_j$ may be determined with reference to FIG. 6, which is not described herein any further.

As illustrated in FIG. 7, pressure detection is practiced by charge transfer and is applied to a self-capacitor, where Tx is a driving signal and may be a sine wave, a square wave and other forms of signal. The basic working principle is as follows:

Firstly, a control switch $\phi_1$ is turned on and a control switch $\phi_2$ is turned off to charge a detection capacitor Ctp, and meanwhile discharge a capacitor C1'; secondly, the control switch $\phi_1$ is turned off and the control switch $\phi_2$ is turned on to charge the capacitor C1' in a voltage division manner and charge a capacitor C2' in an integration manner by using the detection capacitor Ctp; subsequently, an output signal of an integration circuit is sent to a filter circuit for filtering; afterwards, an output signal of the filter circuit is sent to a demodulation circuit for demodulation to acquire a specific form of feature data (Rawdata); and finally, the feature data (Rawdata) is sent to a calculation system, and thus the calculation system may calculate the current pressure according to the current feature data (Rawdata).

FIG. 8 is an embodiment of another capacitance detection method. Tx is a driving signal, and may be a sine wave, a square wave or the like form of signal. The basic working principle may be as follows:

Firstly, a driving signal is coupled via a detection capacitor Ctp to a rear-end integration amplifier circuit; secondary, an output signal of the integration amplifier circuit is sent to a filter circuit for filtering; subsequently, an output signal of the filter circuit is sent to a demodulation circuit for demodulation to acquire feature data (Rawdata); and finally, the feature data (Rawdata) is sent to a calculation system, and thus the calculation system may calculate the current pressure according to the variation of the current feature data (Rawdata).

FIG. 9 is a schematic flowchart of establishing a relative elastic coefficient according to Embodiment 3 of the present disclosure. As illustrated in FIG. 9, the process includes the following steps:

S112: Calculating the real-time pressures output by each sensing electrode when a plurality of predetermined pressures are applied onto each logic channel, according to feature data output by the sensing electrode and a corresponding relationship between the feature data and the pressures, where the logic channels are obtained by dividing the touch screen.

In this embodiment, a plurality of first relative elastic coefficients between each sensing electrode and each logic channel is determined according to the plurality of predetermined pressures and a plurality of pressures output by each sensing electrode, wherein an average value of the plurality of first predetermined relative elastic coefficients is used as a finally determined relative elastic coefficient between the corresponding sensing electrode and the corresponding logic channel.

In this embodiment, when the center of each logic channel is pressed with a predetermined pressure, each sensing electrode corresponds to a piece of feature data, that is, each sensing electrode may correspond to a plurality of pieces of feature data when being applied with a plurality of predetermined pressures. The plurality pieces of feature data are respectively introduced into the corresponding relationship between the feature data and the pressures, for example, the relationship may be a fitting curve, such that the pressure output by each sensing electrode when the predetermined pressure is applied thereon is acquired.

S122: Determining a relative elastic coefficient of each logic channel at each sensing electrode according to the plurality of the predetermined pressures and the pressures output by each sensing electrode when the predetermined pressures are applied.

According to the specific predetermined pressures in a logic channel and the pressures output by each sensing electrode, with reference to equations $$F_a = k_{a0}\Delta d_{a0}, F_0 = k_0 \Delta d_{a0} \Rightarrow F_a = \frac{k_{a0}}{k_0} F_0,$$

the relative elastic coefficient of each logic channel at each sensing electrode is calculated.

Figure 10:
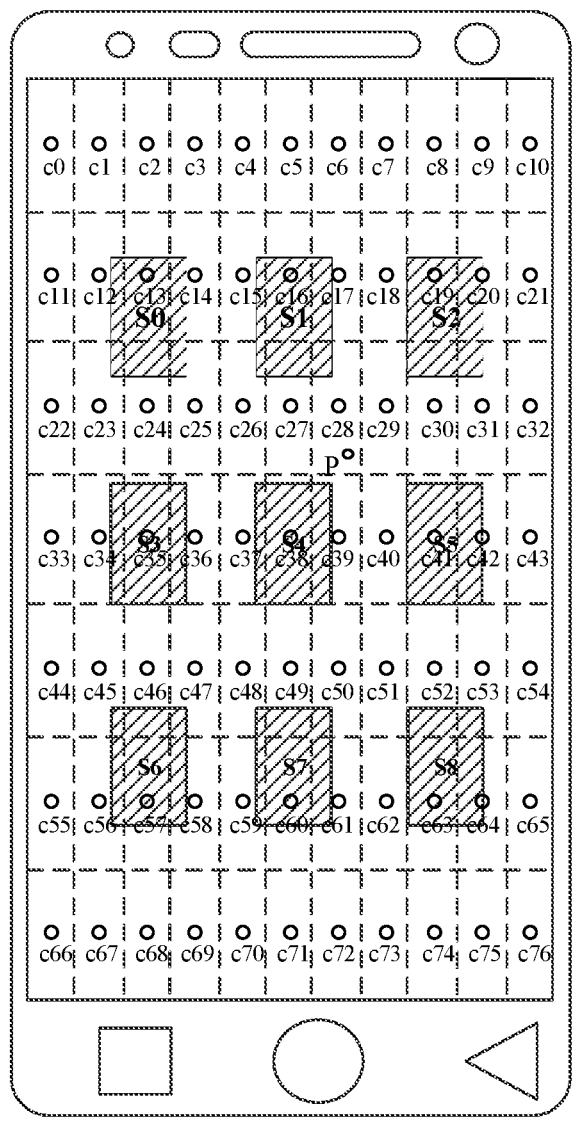
FIG. 10 illustrates the layout of the sensing electrodes and division of logic channels in the method as illustrated in FIG. 9.

FIG. 10 is a schematic diagram of a touch array in the method as illustrated in FIG. 9. A touch screen is divided into N channels, marked as $C_0, C_1, \ldots, C_{N-1}$. In this embodiment, N is 77.

(1) m (m≥1) predetermined pressures $F_1, F_2, \ldots F_m$ are respectively applied onto the center of each logic channel, and the data of each sensing electrode is recorded, that is, the data of each sensing electrode is $r_{i0}^k, r_{i1}^k, \ldots, r_{i8}^k$ when a predetermined pressure $F_k$ is applied to a logic channel $C_i$, where k=1, 2, ..., m, and i=1, 2, ..., N-1.

(2) The $r_{i0}^k, r_{i1}^k, \ldots, r_{i8}^k$, k=1,2,..., m, i=1,2,..., N-1 obtained in step (1) is introduced into a corresponding R-F curve $R_j=f_j(\theta_j,F)$, where j=0,1, ... 8 to calculate the pressure which can be marked as $F_{i0}^k, F_{i1}^k, \ldots, F_{i8}^k$, where k=1, 2, ..., m, i=1,2, ..., N-1.

(3) the relative elastic coefficient $u_{ij}$ of the logic channel $C_i$ at the sensing electrode $S_j$ according to the pressure calculated in step (2), where $$u_{ij} = \frac{1}{m}\sum_{k=1}^{m}\frac{F_k}{F_{ij}^k},$$

$i = 0, 1, \ldots N-1,$ $j = 0, 1, \ldots 8, u_{ij}$ is an average value of a plurality of relative elastic coefficients of the logic channel $C_i$ at the sensing electrode $S_j$ obtained when a plurality of predetermined pressures are applied.

$u_{kj}$ can be stored in the system, as illustrated in Table 2.

TABLE 2

Table of Relative elastic coefficients

| | S0 | S1 | S2 | S3 | S4 | S5 | S6 | S7 | S8 |
|---|---|---|---|---|---|---|---|---|---|
| $C_0$ | $u_{00}$ | $u_{01}$ | $u_{02}$ | $u_{03}$ | $u_{04}$ | $u_{05}$ | $u_{06}$ | $u_{07}$ | $u_{08}$ |
| . | . | . | . | . | . | . | . | . | . |
| . | . | . | . | . | . | . | . | . | . |
| . | . | . | . | . | . | . | . | . | . |
| $C_{N-1}$ | $u_{N-1, 0}$ | $u_{N-1, 1}$ | $u_{N-1, 2}$ | $u_{N-1, 3}$ | $u_{N-1, 4}$ | $u_{N-1, 5}$ | $u_{N-1, 6}$ | $u_{N-1, 7}$ | $u_{N-1, 8}$ |

It should be noted that, in addition to the above method, the relative elastic coefficients may also be obtained by related mechanical simulation software.

Considering the storage space, mass production efficiency and the like factors, the number N of virtual channels is very limited. Therefore, according to the relative elastic coefficients of several logic channels in the vicinity of the touch position relative to each sensing electrode, the relative elastic coefficient at any touch position relative to each sensing electrode is determined by bilinear interpolation or curve fitting.

Assumed that the coordinates of the position P are (x, y) and the coordinates of the positions C28, C29, C39 and C40 are respectively $(x_{28},y_{28})$, $(x_{29},y_{29})$, $(x_{39},y_{39})$ and $(x_{40},y_{40})$, then when the sensing electrode S4 is used as a reference, the relative elastic coefficients at the positions C28, C29, C39 and C40 are respectively $u_{28}, u_{29}, u_{39}$ and $u_{40}$.

Y-axial interpolation:

$$u_{y1} = \frac{y_{39} - y}{y_{39} - y_{28}}u_{28} + \frac{y - y_{28}}{y_{39} - y_{28}}u_{39} u_{y2} = \frac{y_{40} - y}{y_{40} - y_{29}}u_{29} + \frac{y - y_{29}}{y_{40} - y_{29}}u_{40}$$

X-axial interpolation:

$$u_P = \frac{x_{29} - x}{x_{29} - x_{28}}u_{y1} + \frac{x - x_{28}}{x_{29} - x_{28}}u_{y2}$$

In addition, a plurality of logic channels in the vicinity of the position P may also be selected to estimate the relative elastic coefficient at the position P by means of curve fitting. For example, nine logic channels C16, C17, C18, C27, C28, C39, C38, C39 and C40 may be selected to estimate the relative elastic coefficient by secondary curve fitting.

Before delivery from a factory of each product for mass production, the R-F curve of each sensing electrode and the table of relative elastic coefficients may be established by using the above method. Considering the production efficiency, during mass production, the R-F curve and the table of relative elastic coefficients may be established for each sensing electrode by selecting a small number of samples as a standard R-F curve and a standard table of relative elastic coefficients. The R-F curves and the tables of relative elastic coefficients for each sensing electrode of other samples may be obtained by rectification based on the standard R-F curve and the standard table of relative elastic coefficients.

Assume that when a pressure is applied on the position P, the feature data of each sensing electrode is introduced into the corresponding relationships between the feature data and the pressures of each sensing electrodes to output pressures $F_0, F_1, \ldots, F_8$, and the pressures are rectified as $u_{p0}F_0, u_{p1}F_1, \ldots, u_{p8}F_8$ based on the relative elastic coefficients.

Figure 11:
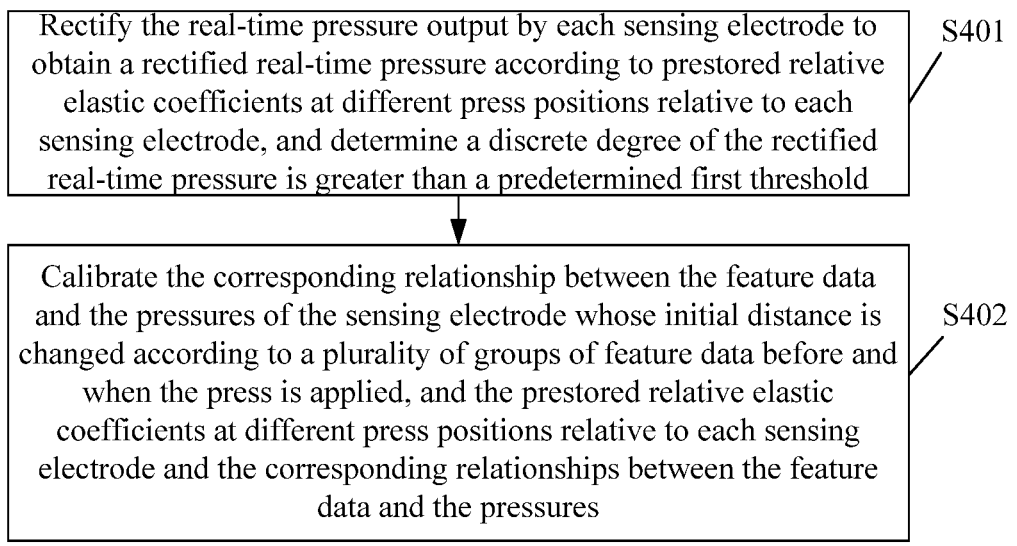
FIG. 11 is a schematic flowchart of a method for self-calibrating a corresponding relationship between the feature data and the pressures according to Embodiment 4 of the present disclosure.

FIG. 11 is a schematic flowchart of a method for self-calibrating a corresponding relationship between the feature data and the pressures according to Embodiment 4 of the present disclosure. As illustrated in FIG. 11, after the sensing electrode whose initial distance is changed is determined according to any of the methods as defined above, the method include the following steps:

S401: rectifying the pressure output by each sensing electrode to obtain a rectified pressure according to pre-stored relative elastic coefficients at different press positions relative to each sensing electrode, and determining that a discrete degree of the rectified pressure is greater than a predetermined first threshold.

In this embodiment, the real-time pressures output by each sensing electrode is rectified to obtain rectified pressures according to the relative elastic coefficients of the logic channels at different positions relative to each sensing electrode established before delivery from a factory.

S402: calibrating and updating the corresponding relationship between the feature data and the pressures of the sensing electrodes whose initial distance is changed according to a plurality of groups of feature data before and when being pressed, and the prestored relative elastic coefficients at different press positions relative to each sensing electrode and the corresponding relationships between the feature data and the pressures of each sensing electrode.

In this embodiment, the corresponding relationship between the feature data and the pressures of the sensing electrode before delivery from a factory may be established with reference to the above embodiment, which is not described herein any further.

In this embodiment the relative elastic coefficients at different positions relative to each sensing electrode before delivery from a factory may be established with reference to the above embodiment, which is not described herein any further.

In this embodiment, the plurality of groups of feature data before and when being pressed refers to the real-time feature data before and after the press on the sensing electrode upon delivery from a factory.

In this embodiment, when it is judged according to the discrete degree of the rectified pressure that the number of sensing electrodes whose initial distance is changed among all the sensing electrodes does not exceed a predetermined number threshold, the corresponding relationship between the feature data and the pressures of the sensing electrode whose initial distance is changed among all the sensing electrodes is calibrated according to the plurality of groups of feature data before and when being pressed, the prestored relative elastic coefficients at different press positions relative to each sensing electrode and the corresponding relationships between the feature data and the pressures of each sensing electrode; or when it is judged according to the discrete degree of the rectified pressure that the number of sensing electrodes whose initial distance is changed among all the sensing electrodes exceeds a predetermined number threshold, an equation set is established to solve a calibration parameter according to the plurality of groups of feature data before and when being pressed, the prestored relative elastic coefficients at different press positions relative to each sensing electrode and the corresponding relationship between the feature data and the pressures of each sensing electrode, the corresponding relationship between the feature data and the pressures of each sensing electrode is calibrated according to the obtained calibration parameter. The number threshold herein may be flexibly defined. For example, when the total number of sensing electrodes is 9, the number threshold may be defined as 2; and if there are more sensing electrodes, the number threshold may be adaptively increased.

Figure 12:
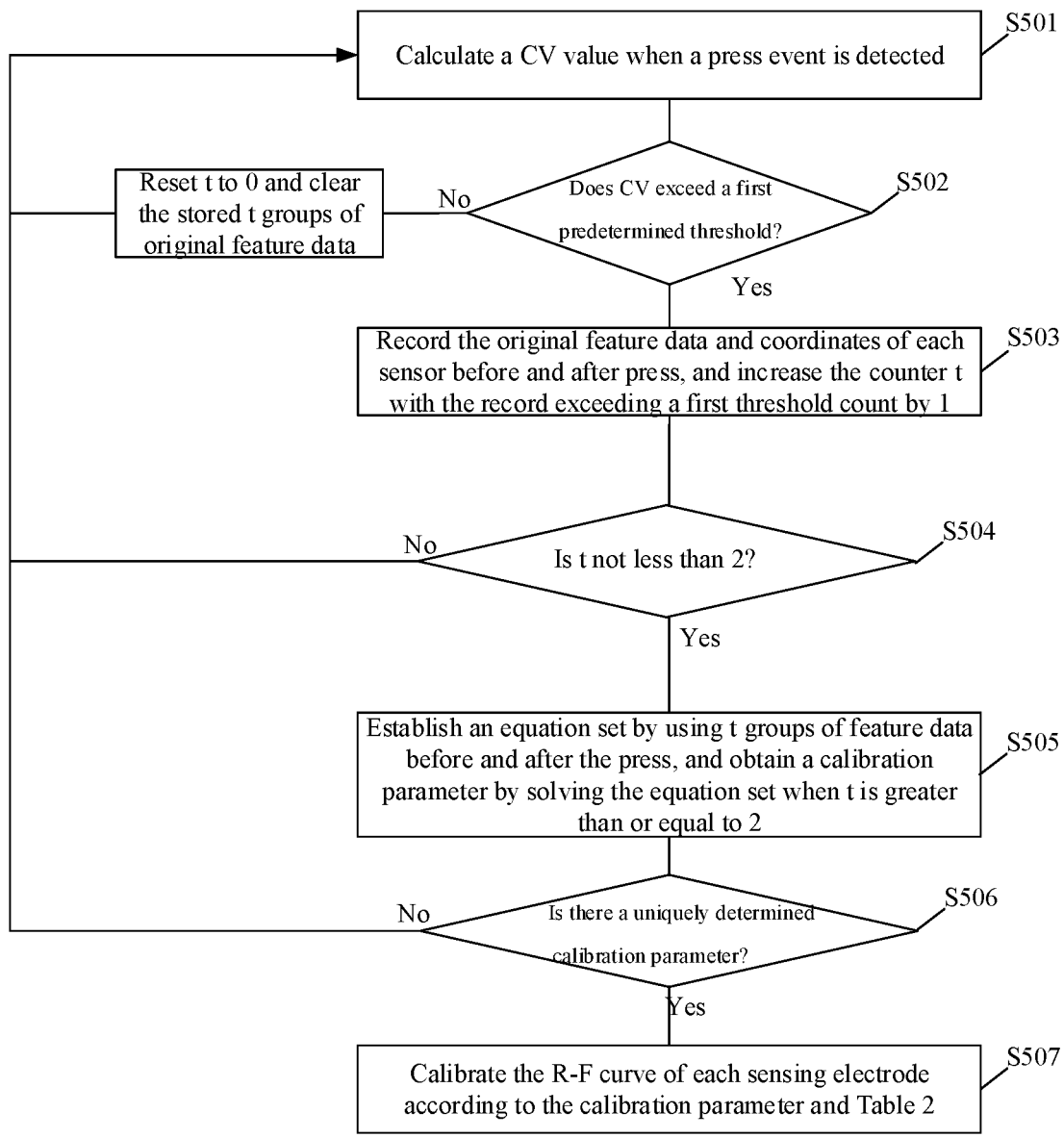
FIG. 12 is a schematic flowchart of a method for self-calibrating a corresponding relationship between the feature data and the pressures according to Embodiment 5 of the present disclosure.

FIG. 12 is a schematic flowchart of a method for self-calibrating a corresponding relationship between the feature data and the pressures according to Embodiment 5 of the present disclosure. As illustrated in FIG. 12, the method includes the following steps:

S501: calculating a CV value when a press event is detected.

S502: judging whether CV exceeds a first predetermined threshold, and if CV exceeds the first predetermined threshold, performing step S503.

S503: recording the raw feature data $\{R_{01}, R_{11}, \ldots, R_{81}\}^t$ and $\{R_{01}, R_{11}, \ldots, R_{81}\}^t$, and coordinates $(x, y)^t$ of each sensing electrode before and when being pressed, and the counter t with the record exceeding a first threshold count is increased by 1, that is, t=t+1 (the initial value of t is 0).

In this step, $R_{00}$ represents the feature data output before a pressure is applied on the sensing electrode S0, $R_{01}$ represents the feature data output when a pressure is applied on S0, and (x, y) represents the coordinates of the center of the press position.

If the value of CV does not exceed the first threshold, t is reset to 0, and the stored t groups of raw feature data are cleared, the process returns to step S501, and the self-calibration function does not need to be started.

S504: judging whether t is not less than 2, if t is greater than or equal to 2, performing step S505, and otherwise, performing step S501.

S505: establishing an equation set by using t groups of feature data $\{R_{00}, R_{10}, \ldots, R_{80}\}^1$, $\{R_{01}, R_{11}, \ldots, R_{81}\}^1$, $(x, y)^1$; ...; $\{R_{00}, R_{10}, \ldots, R_{80}\}^t$, $\{R_{01}, R_{11}, \ldots, R_{81}\}^t$ $(x, y)^t$ before and when being pressed, and a calibration parameter is obtained by solving the equation set $((x, y)^1$ may be the same as $(x, y)^t)$.

S506: judging whether there is a uniquely determined calibration parameter.

If the calibration parameter may not be uniquely determined and thus the process returns to step S501; and if the calibration parameters may be uniquely determined, step S507 is performed.

S507: calibrating the R-F curve $R_j = f_j(\theta_j, F)$ (j=0,1, ... 8) of each sensing electrode according to the calibration parameter and Table 2, and resetting t to 0 and the stored t groups of feature data are cleared.

The solved calibration parameter may be various components of an adjustment parameter $\theta_j$, such that the rectified pressure is consistent with the actual pressure as much as possible.

More simply, if most of the pressures among the calibrated pressures $F_0', F_1', \ldots, F_8'$ are consistent but only a few being greatly different, if $F_2', \ldots, F_8'$ are close to each other and $F_0'$ and $F_1'$ are greatly different from each other, it means that the gap between the sensing electrodes $S_0$ and $S_1$ is changed. FIG. 11 or the process in FIG. 11 may be simplified as follows:

The actual pressure is estimated based on the average value of $F_2', \ldots, F_8'$, and $R_0 = f_0(\theta_0, F)$ and $R_1 = f_1(\theta_1, F)$ are respectively calibrated or Table 1 is updated.

When $F_0', F_1', \ldots, F_8'$ are sparsely distributed, calibration is practiced with reference to the method as illustrated in FIG. 11 or FIG. 12.

FIG. 13 is a schematic flowchart of a pressure detection method supporting self-calibration according to Embodiment 6 of the present disclosure. As illustrated in FIG. 13, the method includes the following steps:

S601: acquiring a corresponding relationship between the feature data and the pressures by self-calibration according to the corresponding relationship between the feature data and the pressures as defined in any of the above embodiments.

S602: calibrating the real-time feature data output by each sensing electrode when being applied with a pressure according to a change of current zero-point feature data of each sensing electrode relative to prestored zero-point data.

S603: calculating the pressure output by each sensing electrode when being applied with a pressure according to the calibrated feature data of each sensing electrode and the corresponding calibrated relationship between the feature data and the pressures.

Hereinafter, FIG. 13 is further schematically illustrated. Hereinafter description is given by using the variation of the zero-point feature data before and after delivery from a factory as an example. It should be noted that in other embodiments or cases, analogously the variation of the zero-point feature data may be a variation of the current zero-point feature data relative to the prestored zero-point feature data. When the corresponding relationship between the feature data and the pressures is calibrated, the prestored zero-point feature data is calculated and updated according to the calibrated corresponding relationship between the feature data and the pressures.

Figure 14:
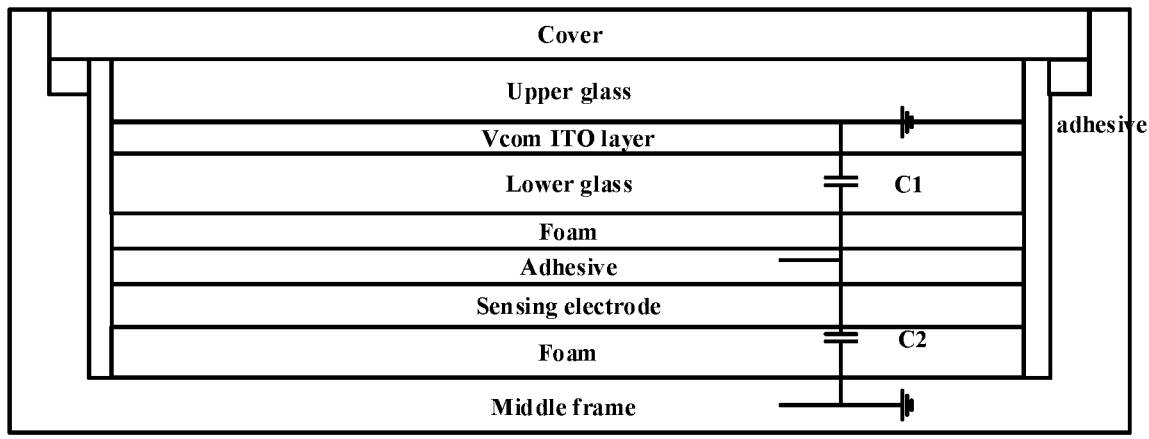
FIG. 14 is a sectional view of a pressure detection apparatus according to Embodiment 7 of the present disclosure.

In practice, common environmental variations include variations of temperature, humidity and the like. Impacts caused by such factors on the curve R=f (0, F) are reflected as overall raising or falling within a specific range, as illustrated in FIG. 14. If the feature data $r_1'$ after delivery from a factory is directly introduced into the R-F curve established before delivery from a factory and the calculated pressures based thereon are F', it is apparent that the pressures F' have a large deviation from the actual pressures F.

With respect to a sensing electrode (for example, S0), the environmental variation within a specific range generally indicates that No $r_0'$, $-r_0=r_1'-r_1$, that is, $r_1=r_1'+(r_0'-r_0')$, where $R_0$ represents the raw feature data when the pressures calculated according to the R-F curve established before delivery from a factory is 0, that is, the zero-point data before delivery from a factory, $r_0'$ represents the current zero-point data when no pressure is applied after delivery from factory, and the pressure calculated by introducing the calibrated feature data $r_1$ into the R-F curve established before delivery from a factory is the actual pressures F. Therefore, each time during calculation of the pressures, the data $r_0 \propto$ and $r_1'$ before been pressed and when being pressed is needed to calculate an offset $(r_0-r_0')$ between the current zero-point data $r_0'$ and the zero-point data $r_0=f(\theta, 0)$ before delivery from a factory, the feature data $r_1'$ corresponding to the current press is updated, that is $r_1' \leftarrow r_1'+(r_0-r_0')$, and then the updated $r_1'$ is introduced into R=f($\theta$,F) to calculate the actual pressure.

FIG. 14 is a sectional view of a pressure detection apparatus according to Embodiment 7 of the present disclosure. As illustrated in FIG. 14, the sensing electrode may be attached below an LCD, and a specific gap is present between the sensing electrode and a middle frame for supporting the LCD module, where the gap is filled with foam having better compressibility. After the system is powered on and starts running, a Vcom layer and the middle frame of the LCD module are connected to the system ground, a pressure detection capacitor $C_1$ is arranged between the sensing electrode and the Vcom layer of the LCD module, and an effective pressure detection capacitor $C_2$ is arranged between the sensing electrode and the middle frame, where $C_1$ and $C_2$ are connected in parallel. When the cover is pressed, the cover is subjected to a deformation such that the distance between the sensing electrode and the middle frame decreases, and the capacitor $C_2$ increases. In this case, the variation of $C_1$ may be substantially ignored, and the current pressure may be determined by detecting the variation of $C_2$.

Figure 15:
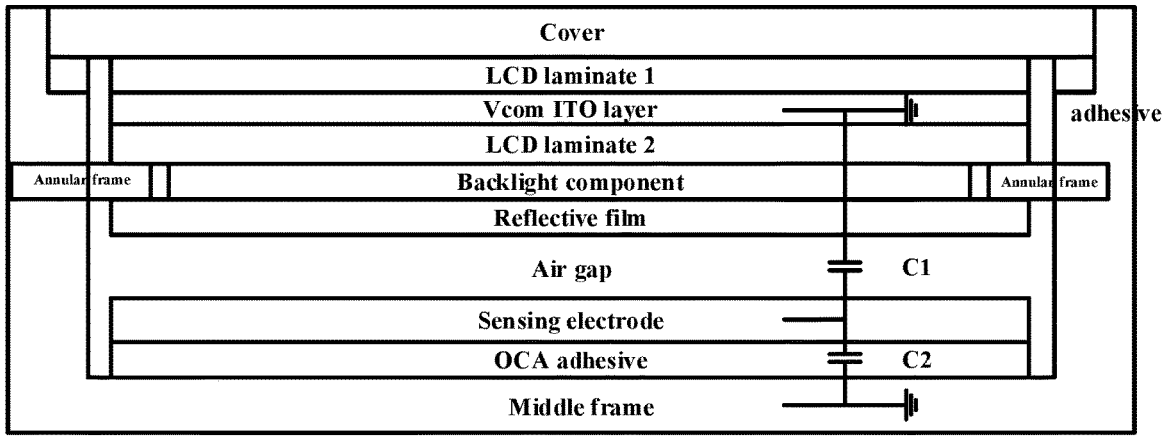
FIG. 15 is a sectional view of a pressure detection apparatus according to Embodiment 8 of the present disclosure.

FIG. 15 is a sectional view of a pressure detection apparatus according to Embodiment 8 of the present disclosure. As illustrated in FIG. 15, in this structure, a sensing electrode is adhered to a middle frame for supporting an LCD module via an OCA adhesive, and a gap is present between the sensing electrode and the LCD module, and a Vcom layer is present between an LCD laminate 1 and an LCD laminate 2 in the LCD module. After the system is powered on and starts running, the Vcom layer and the middle frame of the LCD module are connected to the system ground, a capacitor $C_1$ is present between the sensing electrode and the Vcom layer of the LCD module, and a capacitor $C_2$ is present between the sensing electrode and the middle frame, where $C_1$ and $C_2$ are connected in parallel. When the cover is pressed, the cover is subjected to a deformation such that the distance between the Vcom layer of the LCD module and the sensing electrode decreases, and the effective pressure detection capacitor $C_1$ increases. In this case, the variation of $C_2$ may be substantially ignored, and the current pressure may be determined by detecting the variation of $C_1$.

The position relationship between the backlight component and the reflective film in the above embodiment is not described herein any further.

Figure 16:
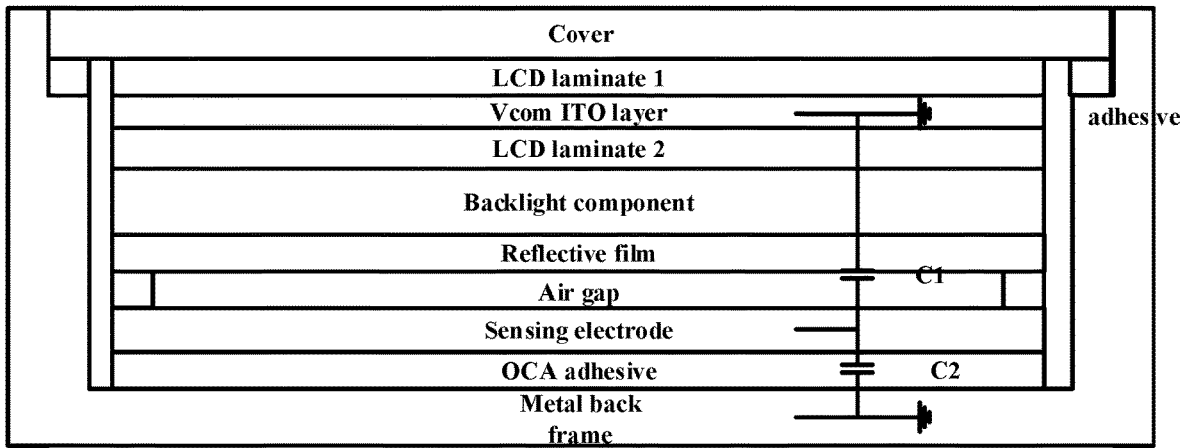
FIG. 16 is a sectional view of a pressure detection apparatus according to Embodiment 9 of the present disclosure.

FIG. 16 is a sectional view of a pressure detection apparatus according to Embodiment 9 of the present disclosure. As illustrated in FIG. 16, the structure is applied to an embodiment in which the LCD module has a metal back frame; and however, the sensing electrode is attached on the metal back frame of the LCD module.

Figure 17:
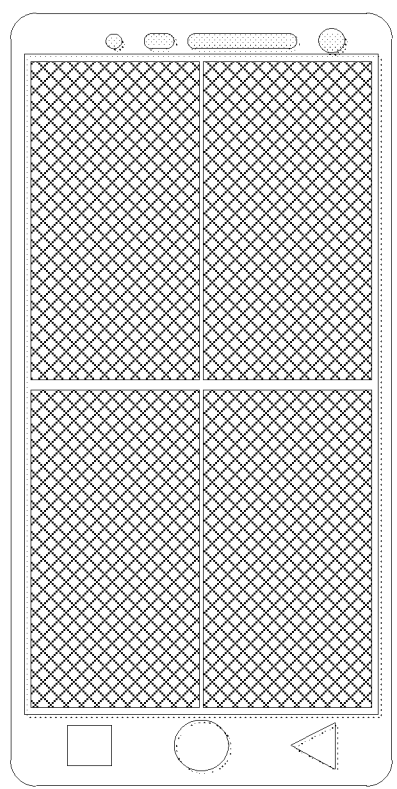
FIG. 17 is a schematic diagram of plane distribution of the sensing electrodes in a pressure detection apparatus according to Embodiment 10 of the present disclosure.
Figure 18:
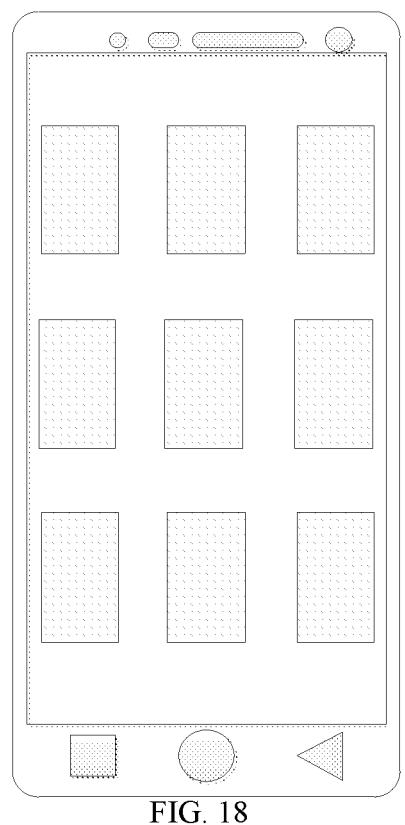
FIG. 18 is a schematic diagram of plane distribution of the sensing electrodes in a pressure detection apparatus according to Embodiment 11 of the present disclosure.
Figure 19:
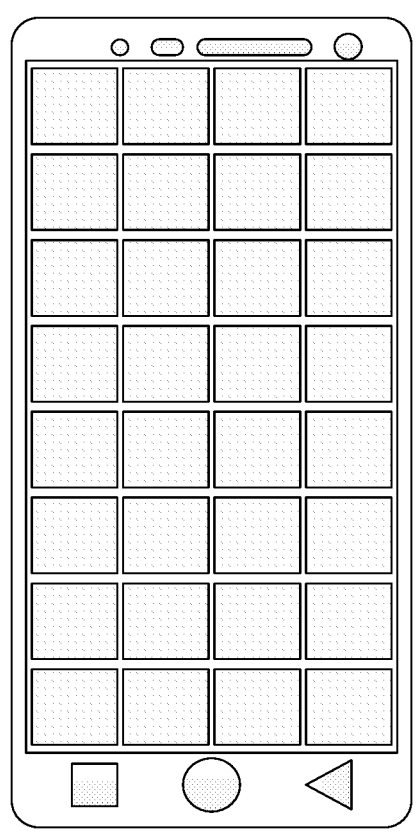
FIG. 19 is a schematic diagram of plane distribution of the sensing electrodes in a pressure detection apparatus according to Embodiment 12 of the present disclosure.

FIG. 17 is a plane distribution view of the sensing electrodes in a pressure detection apparatus according to Embodiment 10 of the present disclosure. FIG. 18 is a plane distribution view of the sensing electrodes in a pressure detection apparatus according to Embodiment 11 of the present disclosure. FIG. 19 is a plane distribution view of the sensing electrodes in a pressure detection apparatus according to Embodiment 12 of the present disclosure. As illustrated in FIG. 17, FIG. 18 and FIG. 19, the number of sensing electrodes may be 4, 9 and 32. It should be noted that the number of sensing electrodes may be flexibly defined according to the actual needs, which is not specifically limited herein.

Figure 20:
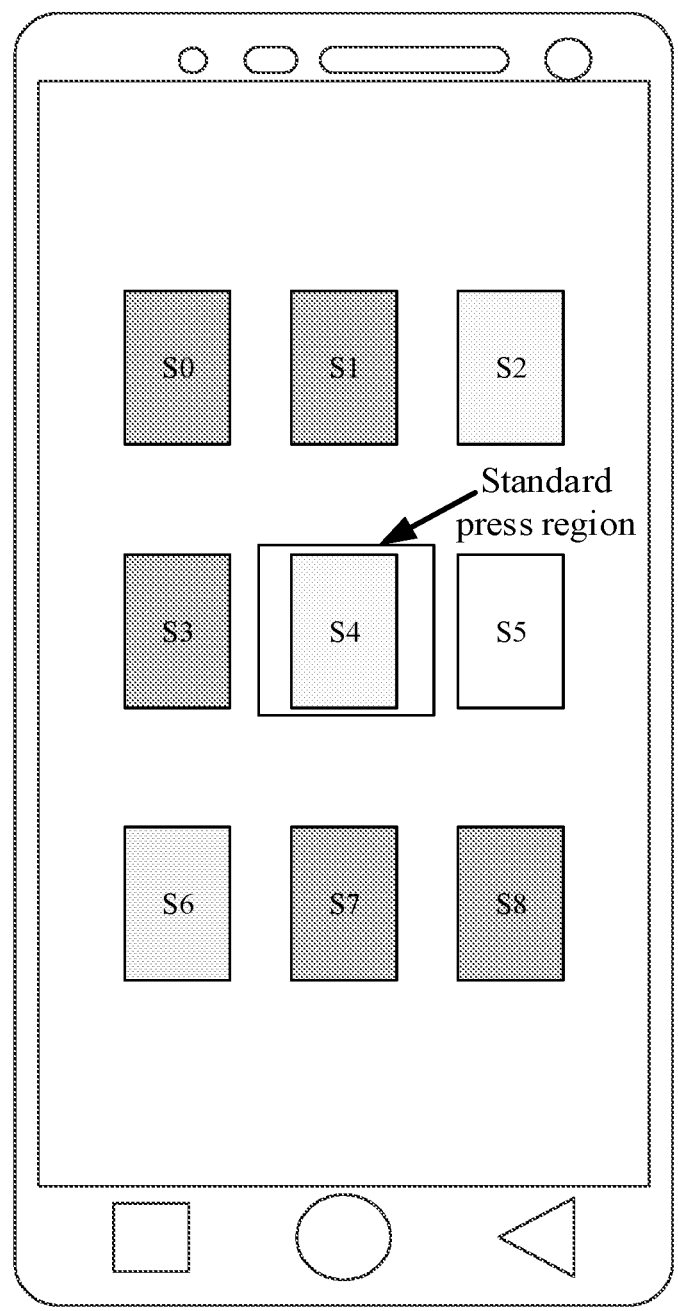
FIG. 20 is a schematic diagram of plane distribution of calibration press points in a pressure detection apparatus according to Embodiment 13 of the present disclosure.

FIG. 20 is a plane distribution view of calibration press points in a pressure detection apparatus according to Embodiment 13 of the present disclosure. As illustrated in FIG. 20, considering that the central position of a press region has a high signal-to-noise ratio relative to the edge of the press region, a calibration press region having a higher signal-to-noise ratio is arranged at a position proximate to the central position of the press region to ensure the accuracy of calibration. After a user manually starts a calibration application, the calibration press region is highlighted on the display screen of an electronic device to guide the user to press multiple times with different pressures to acquire the real-time feature data and then calculate the calibration parameter and store the calculated calibration parameter to the system., such that the corresponding relationship between the feature data and the pressures is calibrated based on the calibration parameter. The calibration method is the same as that described in Embodiment 5 of the present disclosure, which is thus not described herein any further.

Figure 21:
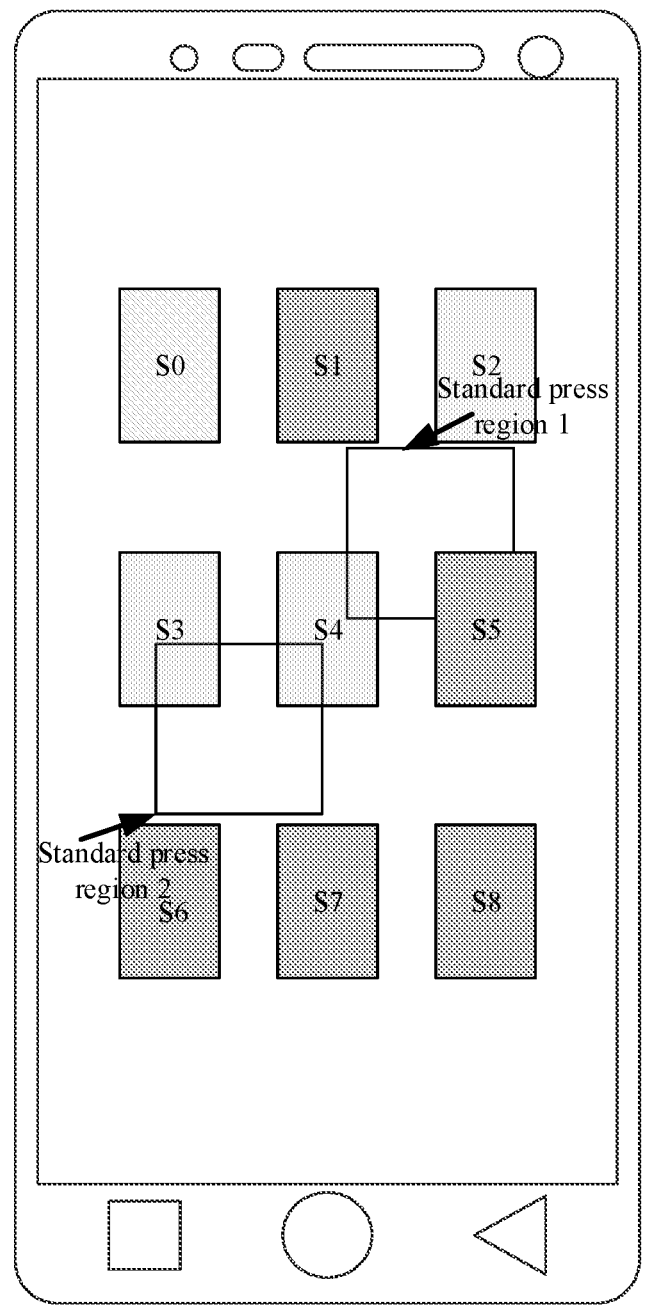
FIG. 21 is a schematic diagram of plane distribution of calibration press points in a pressure detection apparatus according to Embodiment 14 of the present disclosure.

FIG. 21 is a plane distribution view of calibration press points in a pressure detection apparatus according to Embodiment 14 of the present disclosure. As illustrated in FIG. 21, different from the embodiment as illustrated in FIG. 20, two calibration press regions are arranged. After a user manually starts a calibration application, a calibration press region 1 and a calibration press region 2 are sequentially highlighted on the display screen of an electronic device to guide the user to press on the two calibration press regions to acquire the real-time feature data and then calculate the calibration parameter and store the calculated calibration parameter to the system., such that the corresponding relationship between the feature data and the pressures is calibrated based on the calibration parameter. The calibration method is the same as that described in Embodiment 5 of the present disclosure, which is thus not described herein any further.

The apparatus according to the embodiments of the present application may be practiced by a computer program. A person skilled in the art should understand the above division of units and modules is only an exemplary one, and if the apparatus is divided into other units or modules or not divided, the technical solution shall also fall within the protection scope of the present application as long as the information object has the above functions.

A person skilled in the art shall understand that the embodiments of the present application may be described to illustrate methods, apparatuses (devices), or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present disclosure is described based on the flowcharts and/or block diagrams of the method, apparatus (device), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A method for determining a capacitive sensing electrode having a change in an initial distance among all capacitive sensing electrodes in a touch screen, the initial distance being a distance before the capacitive sensing electrode being pressed, the method comprising:
    calculating a real-time pressures output by each sensing electrode according to real-time feature data output by each sensing electrode in the touch screen when a pressure is applied on the touch screen and a corresponding relationship between the feature data and the pressures;
    rectifying the real-time pressures output by each sensing electrode according to prestored relative elastic coefficients at different press positions relative to each sensing electrode, to obtain rectified real-time pressures; and
    determining the sensing electrode having a change in the initial distance among all the sensing electrodes according to a discrete degree of the rectified real-time pressures output by different sensing electrodes.

2. The method according to claim 1, wherein the corresponding relationship between the feature data and the pressures of each sensing electrode in the touch screen is established by: pressing all the sensing electrodes using a plurality of sample pressures to acquire a plurality of pieces of feature data corresponding to each sensing electrode; and establishing a relationship between the feature data and the pressures for each sensing electrode according to the plurality of sample pressures and the plurality of pieces of feature data output by each sensing electrode, and using the relationship as the corresponding relationship between the feature data and the pressures of each sensing electrode.

3. The method according to claim 1, wherein the relationship between the feature data and the pressures is stored in a table form, to calculate the real-time pressures output by each sensing electrode in the touch screen by table lookup; or the relationship between the feature data and the pressures is established via curve fitting and then a storage table is established according to the relationship, to calculate the real-time pressure output by each sensing electrode by table lookup.

4. The method according to claim 3, wherein when the real-time pressure output by each sensing electrode is calculated by table lookup, if the real-time feature data output by the sensing electrode is between two pieces of sample feature data, the real-time pressure output by the corresponding sensing electrode is calculated by piecewise approximation.

5. The method according to claim 1, wherein the relative elastic coefficient of each sensing electrode in the touch screen is established before delivery from a factory by: calculating the real-time pressure output by each sensing electrode according to real-time feature data output by each sensing electrode when a plurality of predetermined pressures are applied onto logic channels of the touch screen, and a corresponding relationship between the feature data and the pressures, wherein the logic channels are obtained by dividing the touch screen; and determining a relative elastic coefficient of each logic channel at the sensing electrodes according to the plurality of the predetermined pressures and the real-time pressure output by each sensing electrode.

6. The method according to claim 5, wherein a plurality of first relative elastic coefficients between each sensing electrode and each logic channel is determined according to the plurality of predetermined pressures and a plurality of pressures output by each sensing electrode, wherein an average value of the plurality of first predetermined relative elastic coefficients is used as a finally determined relative elastic coefficient between the corresponding electrode and the corresponding sensing channel.

7. The method according to claim 5, wherein the relative elastic coefficient at any touch position is determined by bilinear interpolation or curve fitting according to the relative elastic coefficients between several sensing electrodes in the vicinity of the touch position and each logic channel.

8. The method according to claim 1, wherein an average difference, a variance or a coefficient of variation is calculated according to the rectified real-time pressures output by all the sensing electrodes and used as the discrete degree.

9. A method for self-calibrating a corresponding relationship between the feature data and the pressures, comprising the operations in the method for determining a capacitive sensing electrode according to claim 1, the method for self-calibrating a corresponding relationship between the feature data and the pressures further comprising:
determining whether the discrete degree of the rectified real-time pressures output by different sensing electrodes is greater than a predetermined first threshold; and
calibrating the corresponding relationship between the feature data and the pressures of the determined sensing electrode having a change in an initial distance according to a plurality of groups of feature data before and when the press is applied, and the prestored relative elastic coefficients at different press positions relative to each sensing electrode in the touch screen.

10. The method according to claim 9, wherein the corresponding relationship between the feature data and the pressures of each sensing electrode is established by: pressing each sensing electrode in the touch screen using a plurality of sample pressures to acquire a plurality of pieces of feature data corresponding to each sensing electrode; and establishing a relationship between the feature data and the pressures for each sensing electrode according to the plurality of sample pressures and the plurality of pieces of feature data output by each sensing electrode, and using the relationship as the corresponding relationship between the feature data and the pressures of each sensing electrode.

11. The method according to claim 9, wherein the prestored relative elastic coefficients at different press positions relative to each sensing electrode are established by:
calculating the real-time pressure output by each sensing electrode according to real-time feature data output by each sensing electrode when a plurality of predetermined pressures are applied onto logic channels of the touch screen, and a corresponding relationship between the feature data and the pressures, wherein the logic channels are obtained by dividing the touch screen; and
determining a relative elastic coefficient of each logic channel at the sensing electrodes according to the plurality of the predetermined pressures and the real-time pressure output by each sensing electrode.

12. The method according to claim 11, wherein a plurality of first relative elastic coefficients between each sensing electrode and each logic channel are determined according to the plurality of predetermined pressures and a plurality of pressures output by each sensing electrode, wherein an average value of the plurality of first predetermined relative elastic coefficients is configured as a finally determined relative elastic coefficient between the corresponding electrode and the corresponding sensing channel.

13. The method according to claim 9, wherein the relative elastic coefficient at any touch position relative to each sensing electrode is determined by bilinear interpolation or curve fitting according to the relative elastic coefficients of several logic channels relative to each sensing electrode, wherein the several logic channels are in the vicinity of the touch position.

14. The method according to claim 9, wherein when it is judged according to the discrete degree of the rectified real-time pressures that a number of sensing electrodes having a change in the initial distance among all the sensing electrodes does not exceed a predetermined number threshold, the corresponding relationship between the feature data and the pressures of the sensing electrode having a change in the initial distance among all the sensing electrodes is calibrated according to the plurality of groups of feature data before and when the press is applied, the prestored relative elastic coefficients at different press positions relative to each sensing electrode and the corresponding relationships between the feature data and the pressures of each sensing electrode; or
when it is judged according to the discrete degree of the rectified real-time pressures that the number of the sensing electrodes having a change in the initial distance among all the sensing electrodes exceeds a predetermined number threshold, an equation set is established to solve a calibration parameter according to the plurality of groups of feature data before and when the press is applied, the prestored relative elastic coefficients at different press positions relative to each sensing electrode and the corresponding relationship between the feature data and the pressures of each sensing electrode, the corresponding relationship between the feature data and the pressures of each sensing electrode is calibrated according to the obtained calibration parameter.

15. A pressure detection method supporting self-calibration, comprising the operations in the method for self-calibrating a corresponding relationship between the feature data and the pressures according to claim 9, the pressure detection method supporting self-calibration further comprising:
calibrating real-time feature data output by each sensing electrode when being applied with a pressure according to a change of current zero-point feature data of each sensing electrode relative to prestored zero-point data; and
calculating the pressure output by each sensing electrode when being applied with a pressure according to the calibrated feature data of each sensing electrode and the corresponding relationship between the feature data and the pressures.

16. The method according to claim 15, further comprising: manually starting a predetermined application to display a predetermined calibration press region and acquire real-time feature data by pressing the predetermined calibration press region.

17. The method according to claim 15, further comprising: updating prestored zero-point data according to the corresponding relationship between the feature data and the pressures of each sensing electrode.

* * * * *